UNITED STATES PATENT OFFICE.

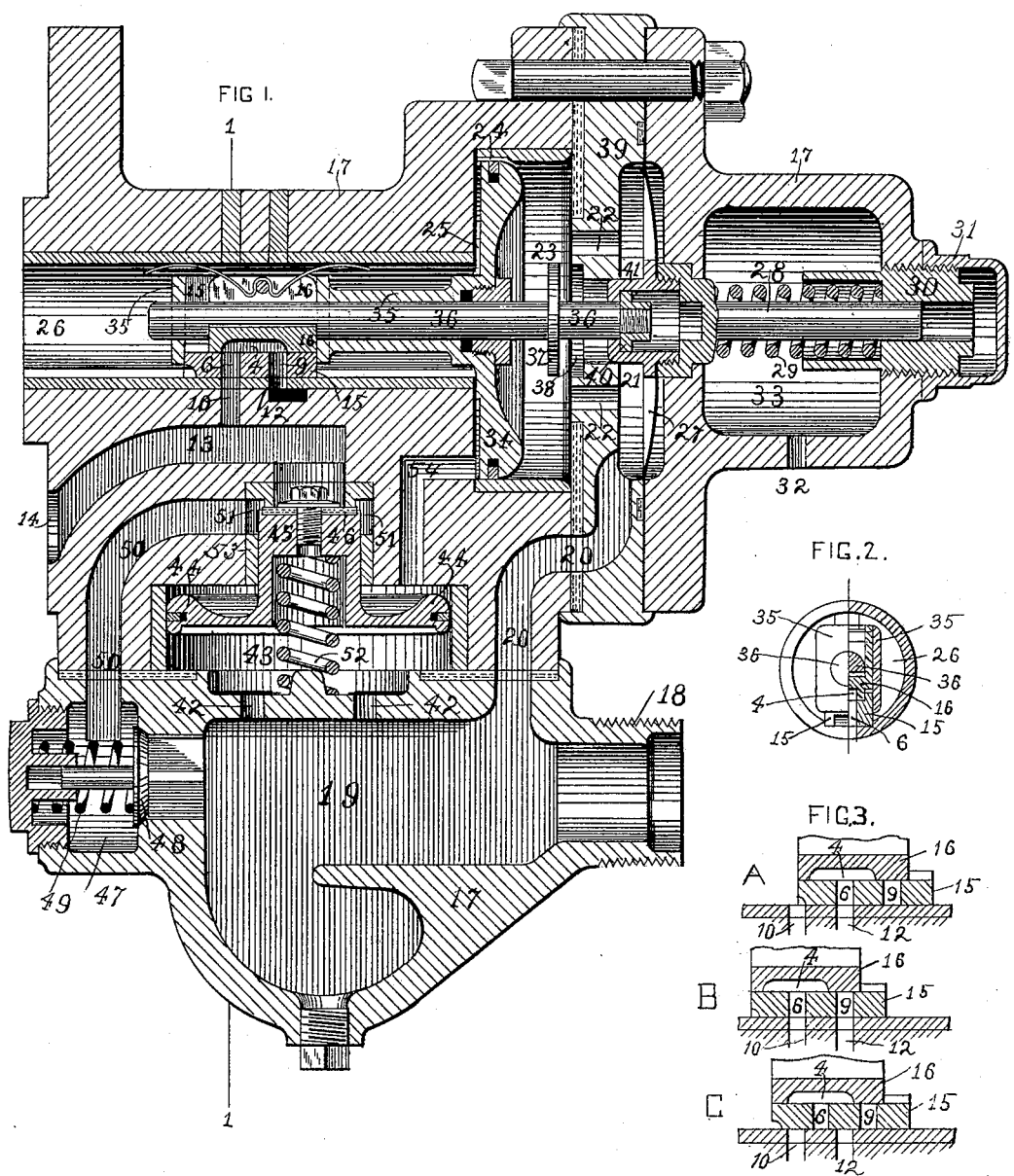

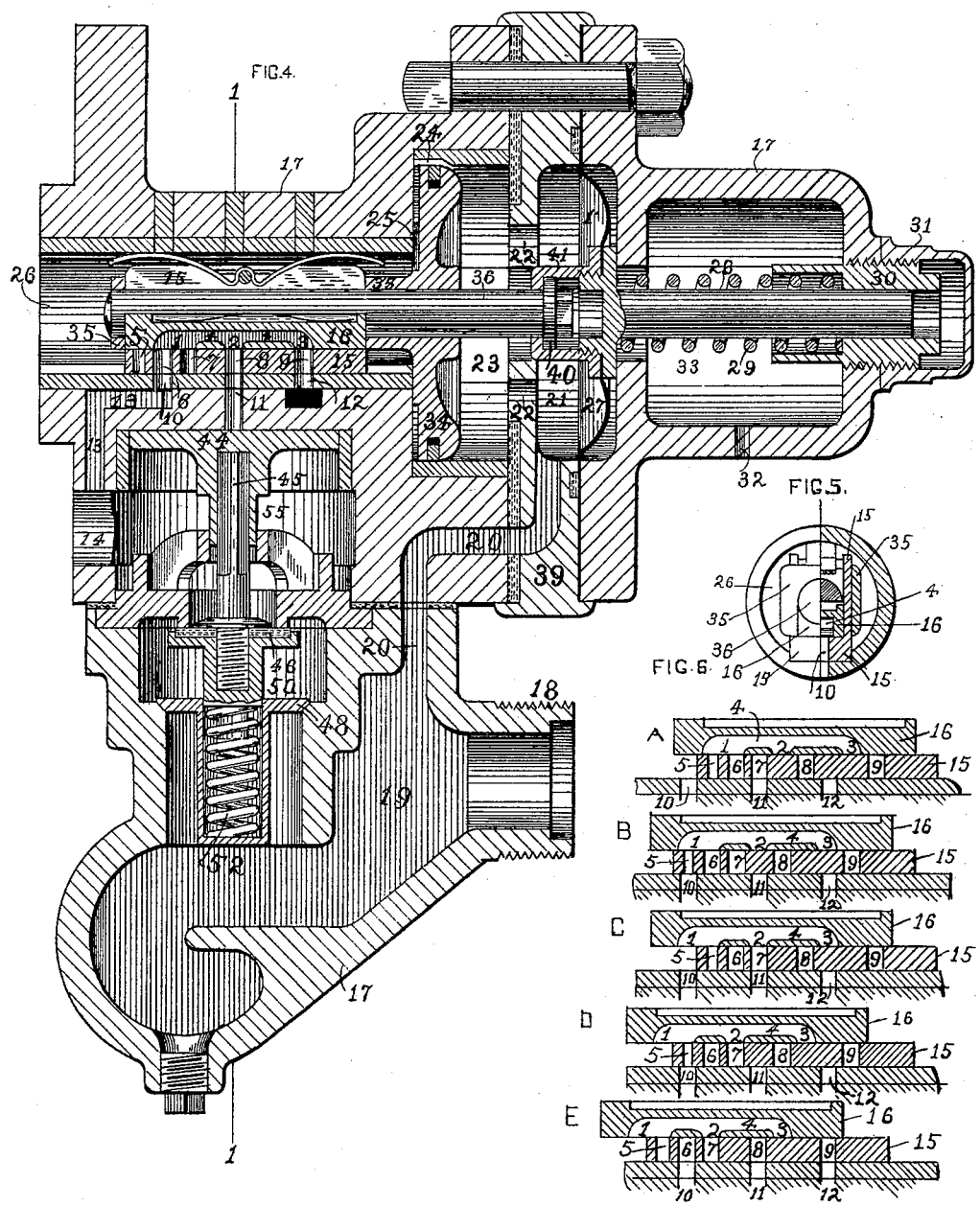

WILLIAM HIRST, OF TRENTON, NEW JERSEY.

AIR-BRAKE.

SPECIFICATION forming part of Letters Patent No. 607,371, dated July 12, 1898.

Application filed February 1, 1897. Serial No. 621,439. (No model.)

*To all whom it may concern:*

Be it known that I, WILLIAM HIRST, a citizen of the United States, residing at Trenton, in the county of Mercer and State of New Jersey, have invented certain new and useful Improvements in Air-Brakes for Railway-Trains, of which improvements the following is a specification.

My invention relates to fluid-pressure brakes for railway-trains, and is that part of the brake mechanism known to those skilled in the art to which it appertains as the "triple valve."

The air or fluid pressure for actuating the brake apparatus is compressed on the locomotive and is stored in a tank called the "main reservoir," which the locomotive carries for that purpose. From the main reservoir a pipe called the "train-line" or "train-pipe" distributes the air or fluid pressure from the main reservoir to the local brake apparatus under each car. The admission and initial discharge of air to and from the train-pipe are under the control of the engineer by means of a device known as the "engineer's equalizing discharge-valve." The normal train-pipe pressure is about seventy pounds and that in main reservoir ninety. The object of this extra pressure in the main reservoir is to more promptly release the brakes and to maintain a reserve from which to recharge the auxiliary reservoirs in the local apparatus without waiting for the air-compressor to supply the pressure. The local apparatus under each car consists of a section of the train-pipe, a triple valve, an auxiliary reservoir, a brake-cylinder, and a pressure-retaining valve, which is connected to the exhaust-port of the triple valve by pipe connections and is usually non-automatic. The triple valve automatically controls the admission of air from the train-pipe to the auxiliary reservoir, from the auxiliary reservoir to the brake-cylinder, and from the brake-cylinder to the atmosphere, and when a sudden and extraordinary reduction in train-pipe pressure is made through the engineer's equalizing discharge-valve or by a rupture in the train-pipe the triple valve also vents the train-pipe to effect quick action, which is a practically simultaneous application of all the brakes on the train, such an application of the brakes being impossible when all the air exhausted from the train-pipe passes out through the engineer's equalizing discharge-valve. The same movement of the ordinary triple valve which admits air to the auxiliary reservoir also exhausts the air from the brake-cylinder, which releases the brakes. When it is necessary to recharge the auxiliary reservoir and at the same time keep the brakes set, the pressure-retaining valve before mentioned is closed by the trainmen, and when closed retains about fifteen pounds pressure within the brake-cylinder.

The object of my invention is to associate or combine the function of pressure-retaining with the other functions of the triple valve—that is, to provide means whereby the triple valve may be moved into the position to recharge the auxiliary reservoir and at the same time automatically retain the pressure in the brake-cylinder.

A further improvement is in the means for locally venting the train-pipe to effect quick action, which increase in sensitiveness as the pressures in auxiliary reservoir and train-pipe decrease.

To this end my invention in general consists of a main valve having passages through it corresponding with ports in the main-valve seat, a piston for operating the valve, as usual, but which is free to move its full stroke at all times, according as the pressure predominates on one side of the piston or the other. In addition to the main valve I employ an auxiliary valve, coöperating therewith, whose seat is on the back of the main valve and which is operated, preferably, by a flexible diaphragm which is exposed on one side to train-pipe pressure or to auxiliary-reservoir pressure and subjected to spring-pressure on the opposite side, by which it is moved when a reduction in the pressure to which it is exposed takes place. The two valves perform their functions by their different movements and positions relative to each other and to the main-valve seat in the manner hereinafter described. The venting or releasing of pressure from the train-pipe to the brake-cylinder or to the atmosphere to effect quick action I accomplish by a differential piston—that is, by exposing different superficial areas to train-pipe pressure and to a pressure which is not subject to fluctuations simultaneous with that in the train-pipe. I make the proportion of these areas about the same as the auxiliary-reservoir and train-pipe pressures by which quick action is effected and emergency applications of the brakes are made.

The detail of the improvement claimed is hereinafter fully set forth and described.

In the accompanying drawings, which illustrate an application of invention, Figure 1 is a central longitudinal section of a triple valve embodying my improvements. Fig. 2 is a lateral half-sectional elevation of the valves of Fig. 1, the plane of the section being located by the line 1 of Fig. 1, looking to the right. Fig. 3 is a series of longitudinal sections of the main and auxiliary valves of Fig. 1, showing their relative positions and taken on the same plane as Fig. 1. Fig. 4 is a central sectional elevation showing a part of my improvement adapted to operate the standard Westinghouse release-valve. Fig. 5 is a cross half-sectional elevation of the main and auxiliary valves of Fig. 4, the plane of the sectional view being indicated by the line 1 of Fig. 4, looking to the right; Fig. 6, a series of sectional views of the main and auxiliary valves of Fig. 4, taken on the same plane, showing their relative positions.

A branch from the train-pipe is attached to the body of the triple valve 17 at the nipple 18, which opens into the chamber 19. From the chamber 19 air passes through the passage 20 into the chamber 21 and through the ports 22 22 into the piston-chamber 23, and from the piston-chamber 23 it passes through the feed-ports 24 and 25 into the valve-chamber 26, which is in open communication with the auxiliary reservoir.

One of the walls of the chamber 21 is formed by the diaphragm 27, which is of a flexible character, and attached to its center is the stem 28, around which is coiled the spring 29. The spring 29 is held in compression between the head of the stem 28 and the adjustable screw-plug 30, which is locked by the cap 31, the spring having sufficient strength to move the stem and the diaphragm against the pressure in the chamber 21 when it is reduced below the normal train-pipe pressure, (seventy pounds.) The port 32 is to release any pressure that may accumulate in the chamber 33.

In the chamber 23 is the main piston 34, from which extends the hollow stem 35, the end of which is enlarged to receive the valves 15 and 16, which operate in chamber 26. The valve 15 is closely fitted in the end of the stem 35 and moves coincidently with and has the same travel as the main piston 34. The back of the main valve 15 forms the seat for the auxiliary valve 16, which is operatively connected without lost motion to the auxiliary-valve stem 36, which is closely fitted in the stem 35 of the main piston 34. In Fig. 1 the valve-stem 36 is provided with the collar 37, which is located in such a position as to enter the counterbore 38 in the partition 39 to arrest the movement of the auxiliary-valve stem 36 and the auxiliary valve 16 when the main piston 34 has completed half its stroke to the right. On the end of the stem 36 is screwed the flanged nut 40, which moves within the nut 41. The nut 41 is screwed on the end of the stem 28 and serves to secure the diaphragm thereto. At its outer end it is flanged inwardly and is adapted to engage the nut 40 to control the position of the valve 16.

In Fig. 1 when the pressure in the chamber 21 has forced the diaphragm 27 and the nut 41 to the right the movement of the auxiliary-valve stem 36 to the left is arrested when the main piston 34 has traveled about half its stroke by the nut 40 engaging the nut 41; but when the pressure in the chamber 21 is lowered to apply the brakes the spring 29 forces the stem 28 and the diaphragm 27 to the left until the rim of the nut 41 abuts the partition 39, in which position the nut 40 has a free movement in the socket of the nut 41 coincident with the main piston 34 and the valve 15.

In Fig. 4 the movement of the nut 40 inside the nut 41 is limited to a travel equal to half the stroke of the main piston 34, and when the normal train-pipe pressure in the chamber 21 has forced the diaphragm 27 and the stem 28 to the right the movement of the auxiliary valve 16 (when the main piston moves to make an application of the brakes) is arrested by the nut 40 abutting the head of the stem 28 when the main piston 34 has traveled half its stroke; but when the pressure in the chamber 21 is lowered to sixty pounds the diaphragm 27 and the stem 28 are forced to the left by the spring 29, which brings the face of the nut 41 beyond the partition 39 far enough to limit the traverse of the main piston 34 to half its normal stroke. It will be seen that the diaphragm 27 is held between the body of the triple valve 17 and the partition 39, with the central portion thereof exposed in and forming the flexible wall of the chamber 21. If the diaphragm were plain and without other support than that just stated, the pressure thereon would come entirely upon the body of the valve, but as the spring 29 is pressing against it it is supported at two places— namely, at its center and at the circumference of the chamber 21. Therefore the pressure thereon is divided between them, and as the line of division is not more than half-way between the nut 41 and the body of the valve and as this line incloses less than half the area of the exposed part of the diaphragm it is evident that only a like proportion of the total pressure thereon will have to be overcome by the spring 29 to move the stem 28, so that if a reduction in train-pipe pressure at one time of ten or twelve pounds is made the main piston 34 would move to the right its full traverse and the diaphragm 27, with the stem 28, would be forced by the spring 29 to the left until the nut 41 abutted the face of the main piston 34, in which position they would be held by the undiminished auxiliary-reservoir pressure on the opposite side of the main piston 34. Therefore the spring 29 could not force the main piston to the left until the auxiliary-reservoir pressure in the chamber 26 and the pressure in chamber 23 had equalized. While the pressures in the auxiliary reservoir and train-pipe are at sixty pounds, a slight reduction in train-pipe pressure would be apt to allow the auxiliary-reservoir pressure to move the main piston 34 and the stem 28 into the position just described, but the difference between these pressures necessary to compress the spring 29 increases as the auxiliary-reservoir pressure decreases, because the pressure in the auxiliary reservoir becomes weaker, while the spring-pressure remains the same, and for this reason a slight reduction in train-pipe pressure can be made when the pressures are below sixty pounds without compressing the spring 29, while a sudden heavy reduction would again compress the spring by moving the main piston 34 its full traverse to the right.

In the form of valve shown in Fig. 1 the main valve 15 is provided with the two passages 6 and 9, which register with the ports 10 and 12 in the main-valve seat when the main piston is in the position to recharge the auxiliary reservoir. The back of the main valve 15 forms the seat of the auxiliary valve 16, in the face of which is the cavity 4, which is of sufficient length to connect the passages 6 and 9 in the main valve 15 when the valves are in the position to release the brakes.

In Fig. 4 the main valve 15 is provided with the passages 6, 8, and 9, which register with the ports 10, 11, and 12 in the main-valve seat when the main valve is in the position to release the brakes and the main piston in the position to recharge the auxiliary reservoir. It is also provided with the auxiliary passage 5, which registers with the port 10 when at half-stroke, also the passage 7, which registers with the port 11 when in the position to make a service or an emergency application of the brakes. As in Fig. 1, the back of the main valve 15 forms the seat of the auxiliary valve 16. The cavity 4 in the valve 16 is provided with the outlets 1, 2, and 3, which register with the passages 6, 8, and 9, respectively, in the main-valve seat when the valves are in the position to release the brakes.

In the main-valve seat the port 10 enters the passage 13, which is in open communication with the brake-cylinder through the opening 14. The passage 11, Fig. 4, leads to a chamber containing a piston for operating a release-valve referred to hereinafter. The passage 12 leads directly to the atmosphere and is termed the "exhaust-port."

In Fig. 1, in the chamber 43 is the piston 44, extending from one side of which is the stem 45, having the release-valve 46 formed on its end. The stem 45 slides in the stationary ring 53, which is closely fitted in the partition which separates the chamber 43 and the passage 50. Below the piston 44 the chamber 43 is in open communication with the chamber 19 through the ports 42 and above the piston with the auxiliary reservoir through the passage 54 and the chamber 26. The superficial area of the upper side of the piston 44 is diminished to the extent of the area of the release-valve 46, which when the brakes are off is open to the atmosphere through the passage 13 and the ports and passages 10, 6, 4, and 9, and the exhaust-port 12 being thus it is not subjected to any pressure. Therefore to cause a movement of the piston 44 the pressure in the chamber 19 would have to be suddenly reduced until it bore the same proportion to the pressure in the chamber above the piston as the upper side of the piston does to the lower, which is about six to seven.

The function of the spring 52 is to sustain the weight of the piston 44 and the release-valve 46 previous to charging the brake system with pressure, and its normal resistance when extended is sufficient only for that purpose. It is of such a character, however, that when compressed by the movement of the piston 44 its resistance multiplies, which prevents the piston from sticking fast after an emergency application of the brakes.

In the entrance to the chamber 47 is the check or non-return valve 48, and around its stem is coiled the spring 49 for closing the valve when the pressures in the chambers 19 and 47 have equalized. The passage 50 leads from the chamber 47 to the annular chamber 51 around the stem 45 and the release-valve 46.

In Fig. 4 the mechanism for effecting quick action of the brakes is that of the Westinghouse system, which consists of the movable abutment or piston 44 for operating the release-valve 46 and is operatively connected thereto by the stem 45. Below the valve 46 is the check or non-return valve 48, within which is the spring 52 for closing the check-valve and the release-valve when the pressures in the chambers 19 and 50 have equalized.

The operation of the form of valve shown in Fig. 1 is as follows: When the brake system is charged with pressure, the valves are in the position shown in the drawings, which is the running position. To make a service application of the brakes, the engineer by means of his equalizing discharge-valve reduces the train-pipe pressure about six or eight pounds. This reduction extends to the main-piston chamber 23. The greater pressure in the chamber 26 then moves the main piston 34 to the right, moving with it the valves 15 and 16, and when the piston 34 has completed half its stroke the collar 37 on the stem 36 enters the counterbore 38, which prevents further movement of the valve 16 to the right, while the main piston 34 and the valve 15 complete their full stroke, bringing the valves into the position shown into Fig. 3ᴬ. Pressure then flows from the auxiliary reservoir through the chamber 26 and the port 10 into the passage 13 and to the brake-cylinder through the opening 14. When the pressure in the chamber 26 has fallen by expansion into the brake-cylinder slightly below that in the chamber 23, the piston 34 moves the valve 15 to the left, carrying the valve 16 with it, and if for any reason the spring 29 should fail to move the stem 28 to the left promptly the nut 40 on the stem 36 would engage the nut 41, which would arrest the movement of the main piston 34 and the valves 15 and 16 and hold them in that position by the friction of the auxiliary valve 16 on the back of the main valve 15, in which the valves would be on lap, Fig. 3ᶜ, thus preventing the premature exhaust of the pressure from the brake-cylinder. If it is desired to admit more pressure to the brake-cylinder, a similar reduction in train-pipe pressure is again made, which acts as before, bringing the piston 34 to the end of its stroke to the right, admitting a further supply of pressure from the auxiliary reservoir through the chamber 26 and the port 10, passage 13, and the opening 14 to the brake-cylinder. Further admissions of pressure to the brake-cylinder in like manner may be made until the pressures in the auxiliary reservoir and brake-cylinder have equalized. When it is desired to release the brakes, the maximum train-pipe pressure is restored, which, acting on the main piston 34, moves it and the main valve 15 to the left to uncover the feed-port 24. The flanged nut 40 on the stem 36 being engaged by the nut 41 prevents any further movement of the valve 16 in that direction, which brings the valves into the position shown in Fig. 1. The brake-cylinder being in open communication with the opening 14 and the passage 13, the pressure is released therefrom through the port 10 and the passage 6, the cavity 4, and the passage 9 into the exhaust-port 12. When the pressure in the train-pipe and in the chambers 21 and 23 is reduced below seventy pounds, the spring 29 forces the stem 28 and the diaphragm 27 to the left until the former engages the partition 39. The main piston 34, moving to the right, brings the valves into position A, Fig. 3, and with the stem 28 in the position just described the nut 40 has a freedom of movement in the nut 41 equal with that of the main piston 34. Therefore the valve 16 will not be moved into the position relative with the main valve 15 to release the brakes as long as the pressure in the train-pipe is below seventy pounds or below that at which the spring 29 is adjusted, and if the pressure in the auxiliary reservoir has become exhausted from repeated admissions to the brake-cylinder the engineer may admit pressure to the train-pipe to recharge the auxiliary reservoirs, and when the main piston 34 moves to the left it will complete its full traverse to uncover the feed-port 24, carrying with it the valve 16 in the same relative position with the valve 15 as in Fig. 3ᴬ, which would bring the valves into the position B, Fig. 3, in which it will be seen that the passage 9 is covered by the face of the valve 16, thus disconnecting the passages 6 and 9, which retains the pressure in the brake-cylinder until the pressure in the train-pipe is raised enough to move the diaphragm 27 to compress the spring 29.

When the train-pipe pressure is reduced to make a service application of the brakes, the reduction of pressure on the larger side of the piston 44 is not sufficient to allow the undiminished pressure on the smaller side to overbalance it. Therefore the release-valve 46 is held to its seat during such an application by the preponderance of pressure on the larger side of the piston, and although the pressure thereon is less per square inch than on the lesser side the total pressure is greater by reason of its larger superficial area. By the expansion of the pressure in the auxiliary reservoir into the brake-cylinder the pressures on the opposite sides of the piston 44 are equalized. Hence subsequent service applications may be made in like manner without opening the release-valve.

When confronted with impending danger and the necessity of bringing the train to a full stop in the shortest possible time, the engineer makes a sudden quick reduction in train-pipe pressure amounting to ten pounds or more, this reduction being first felt by the triple valve nearest the engine. The pressure under the emergency-piston 44 is lowered so much that the undiminished auxiliary-reservoir pressure, acting on the lesser area above the piston, forces it down, which unseats the release-valve 46, which vents the passage 50 and releases the valve 48. Pressure from the train-pipe in chamber 19 then unseats the check-valve 48 and passes in large volume through the passage 50, past the release-valve 46, through the passage 13 and the connection 14 into the brake-cylinder. When the pressures in the chamber 19 and in the brake-cylinder have equalized, the spring 49 reseats the check-valve 48, which prevents any pressure from coming back into the chamber 19. The pressure from the auxiliary reservoir passing through the port 10 adds its superior force to that already in the brake-cylinder, thus giving the greatest pressure to the brake-shoes that the apparatus is capable of. Although the port 10 is opened at the same time as the release-valve 46, it is so small in comparison with the release-valve and the passages 13 and 50 that the air passing through it during the operation of venting the train-pipe is inconsiderable, the large capacity of the release-valve and the passages 13 and 50 making the releasing of the pressure from the train-pipe almost instantaneous.

While it is herein stated that the reduction in train-pipe pressure causing an emergency application of the brakes is sudden and rapid, which is so from the fact that rapidity of action is the essential feature of an emergency application, it is not necessarily so, however, to cause a movement of the piston 44, as with my improvement the reduction may be gradual, as in service applications, as there are no feed or relief ports or passages through which there is direct communication between the opposite sides of the piston for the purpose of equalizing the pressures thereon, as in devices previously patented, in which the pistons for operating the release-valves are separate and unconnected with the triple valve, and the effective areas of the opposite sides of the said pistons are the same, and which depend upon spring-pressure, frictional resistance, or both, to prevent their movement during a service application. In my improvement the spring under the emergency-piston may be removed and no uncalled-for action would result by reason of its differential character, as explained.

The venting of the train-pipe by the first triple valve operates the next succeeding one, and so on, in such rapid succession as to practically effect a simultaneous application of all the brakes on the train.

As the movement of the emergency-piston 44 depends upon a determined ratio between the auxiliary-reservoir and train-pipe pressures, it follows that if these pressures are below the normal pressure (seventy pounds) the reduction in train-pipe pressure necessary to establish this ratio would be proportionally less, and if there were any pressure in the brake-cylinder, as during a service application, this pressure, extending to the passage 13, would tend to press the valve 46 downward, which would further increase the sensitiveness of the emergency-piston in an emergency application of the brakes immediately following a light or service application.

In making a service application with the form of valve shown in Fig. 4 the main piston 34 moves the main valve 15 and the auxiliary valve 16 to the right, and when the main piston has completed half its traverse the end of the stem 36 abuts the end of the stem 28 within the nut 41, stopping the further movement of the valve 16, while the main piston 34 and the valve 15 complete their traverse, which brings the valves into the relative position shown in Fig. 6$^A$, which is the position of the valves in which a light or service application of the brakes is made. Pressure then passes through the port 10 and through the connection 14 into the brake-cylinder. When the pressure in the auxiliary reservoir and in the chamber 26 falls by expansion into the brake-cylinder slightly below that in chamber 23, the main piston 34 moves the valves 15 and 16 to the left until the flange on the nut 40 engages the flange on the nut 41, and as the difference on the opposite sides of the piston is not sufficient to overcome the friction between the two valves they are held in that position (on lap, Fig. 6$^B$) until the pressure in the train-pipe is again diminished or increased, according as a further application of pressure or release of the brakes is desired.

When an unusual and rapid reduction in train-pipe pressure is made to effect quick action. The movement of the main piston 34 and the valves 15 and 16 to the right is followed by a movement of the stem 28 to the left until the face of the nut 41 abuts the face of the piston 34, the movement of the main piston brings the valves into the service position, Fig. 6$^A$, and the movement of the stem 28 to the left, pushing the stem 36 before it, causes the valve 16 to override the end of the valve 15, Fig. 6$^C$. Pressure then passes through the port 10, passage 13, and connection 14 into the brake-cylinder and at the same time through the opening 1 in the face of the valve 16 into the cavity 4, through the opening 2 and the passages 7 and 11 into the chamber 55 above the piston 44, which is forced downward, unseating the release-valve 46. The pressure in the chamber 19 then raises the check-valve 48 from its seat and passes in comparatively large volume past the release-valve into the chamber 55 and through the outlet 14 into the brake-cylinder. When the pressures in the brake-cylinder and in the chamber 19 have equalized, the spring 52 reseats the check-valve 48 and the release-valve 46, thus preventing the return of pressure to the chamber 19. The auxiliary-reservoir pressure passing through the port 10, passage 13, and the outlet 14 into the brake-cylinder completes the application. As shown in Fig. 1, the pressure from the auxiliary reservoir passing through the port 10 during the venting of the train-pipe is inconsiderable, owing to the restrictive size of the port 10. When the valves are in this position, Fig. 6$^C$, the stem 28 has traversed only half its stroke on account of the face of the nut 41 abutting the face of the main piston 34, which is held in its position by the greater auxiliary-reservoir pressure in chamber 26. In this form of valve, Fig. 4, the spring 29 is adjusted to move the stem 28 when the pressure in the chamber 21 has been reduced about ten pounds, and if this reduction has been sudden the disparity between the pressures in the chambers 23 and 26 moves the main piston 34 its full traverse to the right, which limits the movement of the stem 28 to the left, as just described, which puts the valves in position to effect quick action; but if the train-pipe pressure has been reduced by a series of gradual and light reductions, as in making a succession of service applications, the spring 29 forces the stem 28 to the limit of its stroke to the left, which projects the nut 41 into the chamber 23 far enough to restrict the main valve 15 and the piston 34 to half their normal travel, and as long as the pressure in the train-pipe is below sixty pounds and the reductions in train-pipe pressure to apply the brakes are light the spring 29 will hold the nut 41 in this position, in which when it is desired to admit pressure to the brake-cylinder the main piston 34 and valve 15 move only far enough to register the auxiliary passage 5 with the port 10 in the main-valve seat, Fig. 6⁰, through which pressure passes to the brake-cylinder. The flanged nut 40 now having an unrestricted movement in the nut 41 equal to the half-travel of the main piston 34 the latter, when the pressure in chamber 26 falls slightly below that in chamber 23, is moved to the end of its stroke to uncover the feed-port 24 without altering the relative positions of the valves 15 and 16, which allows the auxiliary reservoir to be recharged up to the pressure at which the diaphragm 27 and the stem 28 are moved to the right, if desired, without releasing the brakes, the valves 15 and 16 then being in the position shown in Fig. 6ᴱ, in which it will be seen that the passages 6, 8, and 9 are covered by the face of the valve 16, which prevents the passage of pressure to and from the brake-cylinder through the passage 6 or to the piston 44 through the passages 8 and 11 or to the atmosphere through the exhaust-passages 9 and 12. When it is desired to release the brakes, the full train-pipe pressure is restored, which, extending to the chamber 21, acts on the diaphragm 27 to compress the spring 29. The stem 28, moving to the right, draws with it the auxiliary-valve stem 36 and the auxiliary valve 16, bringing them into the position shown in Fig. 4, in which the passages leading to the brake-cylinder and to the chamber 55 on both sides of the piston 44 are open to the atmosphere through the exhaust-port 12.

The term "main valve" is used herein because it is customary to so designate that part of the triple valve operated by the main piston. The main valve herein shown and described differs from those heretofore used inasmuch as the passages through it are continuations of the ports in the main-valve seat and that its functions are performed by the different combinations of these passages and ports with the coöperation of auxiliary valve 16, and also that it is not capable of performing any function by itself except to uncover the service-port 10. It will be understood, therefore, that the term as used in this specification is qualified to cover the main valve herein shown and described, being referred to by the number 15.

With my improvement it is possible to always have the auxiliary reservoir charged to the normal pressure, (seventy pounds per square inch,) as it can be recharged whenever necessary without releasing the brakes, and also the engineer can retain any degree of pressure in the brake-cylinder, as the mechanism does not limit him to a predetermined amount. This is particularly advantageous when prolonged applications of the brakes are necessary, as in running down grades, as with my improvement the amount of pressure retained in the brake-cylinder may be varied to suit the weight of the train or according as the grade may be heavy or light. A loaded train upon a steep grade requires a correspondingly high pressure in the brake-cylinder to keep it under control, while with a light train upon an easy grade a comparatively low pressure is sufficient. Hence the desirableness of means whereby the amount of pressure retained in the brake-cylinder may be graduated to meet the varied conditions is apparent.

While having described my invention with considerable minuteness, I do not limit myself to the exact construction herein shown, as I may rearrange the details and substitute mechanical equivalents without departing from the spirit of the invention.

What I claim as my invention, and desire to secure by Letters Patent, is—

1. In an automatic fluid-pressure brake system, the combination with the train-pipe auxiliary reservoir and brake-cylinder, of a triple-valve device provided with a main valve having two faces, and provided with passages through it as described, a piston for operating the said main valve, an auxiliary valve having its seat on the back of the main valve, a flexible diaphragm or movable abutment for controlling the position of the auxiliary valve, and the means whereby the said auxiliary valve is allowed a limited movement with the main valve and its operating-piston independent of the diaphragm, substantially as shown and described.

2. In an automatic fluid-pressure brake system, the combination with the train-pipe auxiliary reservoir and brake-cylinder, of a triple-valve device provided with a main valve having two faces, and provided with passages through it as described, a piston for operating the said main valve, an auxiliary valve having its seat on the back of the main valve, a flexible diaphragm or movable abutment for controlling the position of the auxiliary valve relative to the main valve to release the brakes, and the means whereby the main valve and its operating-piston are allowed to move the said auxiliary valve independent of the diaphragm when the train-pipe pressure is below the normal limit, substantially as shown and described.

3. In an automatic fluid-pressure brake system, in a triple-valve device, a main valve having two faces and passages through it from one face to the other which are adapted to register with ports in the main valve's seat, a movable abutment or piston for operating the said main valve, an auxiliary valve having its seat on one of the faces of the main valve and adapted to control the passage of fluid-pressure through the same, a flexible diaphragm or movable abutment exposed on one side to fluid under pressure and on the opposite side to spring-pressure for controlling the position of the auxiliary valve and for controlling the travel of the main valve and its operating-piston allowing the said main valve and its operating-piston full or limiting its stroke according to the relative condition of the auxiliary reservoir and train-pipe pressures, substantially as set forth.

4. In an automatic fluid-pressure brake system, the combination with the train-pipe auxiliary reservoir and the brake-cylinder, of a triple-valve device provided with a main valve having two faces and provided with the passages as described, a piston for operating the said main valve, an auxiliary valve having its seat on the back of the main valve, and a flexible diaphragm or movable abutment with means for controlling the movement of the said auxiliary valve whereby the pressure in the brake-cylinder may be exhausted into the atmosphere or retained in the brake-cylinder while the auxiliary reservoir is being recharged, substantially as shown and described.

5. In an automatic fluid-pressure brake system, in a triple-valve device, a main valve having two faces and passages through it from one face to the other which are adapted to register with ports in the main valve's seat, an auxiliary valve having its seat on one of the said faces and adapted to control the passage of fluid-pressure through the said main valve, and means for controlling the positions of the said valves comprising a movable abutment actuated by fluid-pressure on both its sides and a movable wall exposed to fluid-pressure on one side and to spring-pressure on the other whereby fluid-pressure is admitted to the brake-cylinder released therefrom or retained therein according to the condition of the pressure in the train-pipe, substantially as set forth.

6. In an automatic fluid-pressure brake system, a triple-valve device provided with a main valve as described, a movable abutment or piston mechanically connected thereto and for operating the main valve, an auxiliary valve having its seat on the back of the main valve, a stem operatively connected to the auxiliary valve which passes through and operates in the main-valve piston, a flexible diaphragm or movable wall exposed on one side to spring-pressure and on the opposite side to fluid-pressure for operating the auxiliary valve, a stem held in the said diaphragm and a coupling by which the said stem and the auxiliary-valve stem are connected and which is adapted to allow the main valve and its operating-piston to partly or wholly control the movement of the auxiliary valve according to the condition of the pressure in the train-pipe, substantially as described.

7. In an automatic fluid-pressure brake system, the combination with the train-pipe auxiliary reservoir and the brake-cylinder, a main valve and its operating-piston, an auxiliary valve operated by means of a stem passing through the main piston, a movable wall exposed on one side to fluid-pressure and on the other to spring-pressure for operating the auxiliary valve, a stem held in the said movable wall and a loose coupling composed of two flanged members male and female by which the movable wall controls the position of the auxiliary valve through the said stem and the auxiliary-valve stem, substantially as shown and described.

8. In an automatic fluid-pressure brake system, the combination with the train-pipe auxiliary reservoir and the brake-cylinder, of a triple-valve device comprising a piston for operating the main valve, an auxiliary valve having its seat on the back of the main valve, a stem mechanically connected to and for moving the auxiliary valve, a flexible diaphragm or movable abutment for operating the auxiliary valve exposed on one side to train-pipe pressure and on the opposite side to spring-pressure and having a stem held in its center with means to connect the said stem with the auxiliary-valve stem by which the position of the auxiliary valve relative to the main valve is finally controlled but which allows the main valve and its operating-piston to effect a preliminary movement of the auxiliary valve in either direction, substantially as shown and described.

9. In an automatic fluid-pressure brake system, the combination in a triple-valve device, of a main valve, a piston mechanically connected to and for operating the main valve, an auxiliary valve having its seat on the back of the main valve, a stem operatively connected to and for moving the auxiliary valve, a flexible diaphragm or movable abutment for controlling the position of the auxiliary valve having a stem held in its center, and means to connect the said stem with the auxiliary-valve stem whereby the main valve and its operating-piston effect a preliminary movement of the auxiliary valve independent of the diaphragm into a position to cut off all intercommunication through the triple valve to graduate the pressure in the brake-cylinder in a service application of the brakes, substantially as shown and described.

10. In an automatic fluid-pressure brake system, the combination in a triple-valve device, of the main valve as described, a piston for operating the main valve, an auxiliary valve having its seat on the back of the main valve adapted to control the passage of fluid-pressure through the main valve, a stem mechanically connected to the auxiliary valve, a flexible diaphragm or movable abutment for controlling the position of the auxiliary valve when the pressure in the brake system is manipulated to release the brakes, a stem held in the center of the said diaphragm and the means for connecting the said stem with the auxiliary-valve stem whereby the main valve and its operating-piston may be moved into the position to recharge the auxiliary reservoir with the auxiliary valve in the position relative to the main valve to retain the pressure in the brake-cylinder when the pressure in the train-pipe is below the normal limit, substantially as set forth.

11. In an automatic fluid-pressure brake system, the combination in a triple-valve device, of the main valve as described, a piston for operating the main valve, an auxiliary valve having its seat on the back of the main valve adapted to control the passage of fluid-pressure through the main valve, a stem mechanically connected to the auxiliary valve, a flexible diaphragm or movable abutment for controlling the position of the auxiliary valve when the pressure in the brake system is manipulated to release the brakes; a stem held in the center of the said diaphragm which is moved to restrict the main valve and its operating-piston to half their normal travel when the pressure in the train-pipe is reduced, a slip-joint for connecting the said stem with the auxiliary-valve stem whereby the main valve and its operating-piston control the movement of the auxiliary valve when restricted to half-travel, and a passage through the main valve controlled by the auxiliary valve adapted to admit fluid under pressure from the auxiliary reservoir to the brake-cylinder, substantially as shown and described.

12. In an automatic fluid-pressure brake system, the combination with the train-pipe auxiliary reservoir and brake-cylinder, of a main valve as described, a piston for operating the main valve having a hollow stem adapted to receive the main valve, an auxiliary valve riding on the back of the main valve, a stem operatively connected to the auxiliary valve passing through the hollow stem of the main piston, a flexible wall or movable abutment having a stem held in its center and means whereby the said stem is connected to the auxiliary-valve stem by which the movement of the auxiliary valve may be controlled by the main valve and its operating-piston or by the movable wall or abutment to release or retain the pressure in the brake-cylinder according to the pressure of fluid in the train-pipe, substantially as set forth.

13. In an automatic fluid-pressure brake system, the combination with the train-pipe auxiliary reservoir and the brake-cylinder, of a main valve and an auxiliary valve adapted by coöperation to release fluid under pressure into the brake-cylinder to exhaust it therefrom or to retain it therein by their different positions relative to each other and to the main-valve seat, and means separate and independent of each other for controlling the positions of the said valves which consists of a piston exposed on both sides to fluid-pressure and a movable wall exposed on one side to fluid-pressure and on the opposite side to spring-pressure, substantially as described.

14. In an automatic fluid-pressure brake system, the combination in a triple-valve device, of a main valve and an operating-piston as described, an auxiliary valve having its seat on the back of and adapted to control the passage of fluid-pressure through the said main valve, a stem operatively connected to the auxiliary valve and passing through and operating in the main-valve piston, a flexible diaphragm or movable abutment for operating the auxiliary valve having a stem held in its center and the means to connect the said stem with the auxiliary-valve stem, substantially as and for the purpose described.

15. In an automatic fluid-pressure brake system, the combination with the train-pipe auxiliary reservoir and the brake-cylinder, a direct passage from the train-pipe to the brake-cylinder controlled by a release-valve which is operated by a differential piston which operates in a chamber separate from and unconnected with the said passage, the effective area of the opposite sides of the said piston being of such relative proportion that a service reduction in train-pipe pressure may be made without opening the release-valve, substantially as described.

16. In an automatic fluid-pressure brake system, the combination with the train-pipe auxiliary reservoir and the brake-cylinder, a direct passage from the train-pipe to the brake-cylinder controlled by a release-valve which is operated by a differential piston which operates in chamber separate from and unconnected with the said passage, the said chamber having communication with the train-pipe on the larger side of said piston and with the auxiliary reservoir on the smaller side by which one or a series of service applications of the brakes may be made without opening the release-valve, substantially as described.

17. In an automatic fluid-pressure brake system, the combination with the train-pipe auxiliary reservoir and the brake-cylinder, of a chamber having communication with the train-pipe and the brake-cylinder, a release-valve for releasing fluid-pressure from the train-pipe to the brake-cylinder through the said chamber, a second chamber separate from the first having connections with the train-pipe and the auxiliary reservoir respectively, a differential piston operating in the secondary chamber between the said connections and operatively connected to the release-valve for operating the same, the said piston by means of the relative proportion of the areas of its opposite sides being adapted to hold the release-valve to its seat by train-pipe pressure when a service reduction in the said pressure is made and to open the release-valve by auxiliary-reservoir pressure when an extraordinary reduction in train-pipe pressure is made at one time, substantially as and for the purpose described.

18. In an automatic fluid-pressure brake system, the combination with the train-pipe auxiliary reservoir and the brake-cylinder, of a chamber having communication with the train-pipe through a passage in which operates a non-return valve, a release-valve for releasing fluid under pressure from the train-pipe through the said chamber, a second chamber separate from the first in which operates a movable abutment having a stem formed on one of its sides and extending through the partition between the said chambers, the said stem being enlarged for the purpose of reducing the effective area of one side of the abutment and for operatively connecting the same with the release-valve, substantially as shown and described.

19. In an automatic fluid-pressure brake system, the combination with the train-pipe auxiliary reservoir and the brake-cylinder, of a release-valve for releasing fluid under pressure from the train-pipe operated by a differential piston which is exposed to train-pipe pressure on one side and to auxiliary-reservoir pressure on the other, the said piston operating in a chamber separate from and unconnected with that controlled by the release-valve and whose sides are proportioned to each other as the pressures in the train-pipe and the auxiliary reservoir by which an emergency application of the brakes is made whereby the piston remains inoperative except when the pressure in the train-pipe is reduced to cause an emergency application of the brakes to be made, substantially as shown and described.

20. In an automatic fluid-pressure brake system, the combination of a passage connecting the train-pipe and the brake-cylinder, a release-valve operating therein, a chamber separate from and unconnected with the said passage having communication with the train-pipe and the auxiliary reservoir respectively, and a movable abutment having an enlarged stem formed on one of its sides for reducing the effective area thereof and for operatively connecting the same with the release-valve, substantially as shown and described.

21. In an automatic fluid-pressure brake system, the combination with the train-pipe auxiliary reservoir and the brake-cylinder, of a direct passage from the train-pipe to the brake-cylinder controlled by a release-valve which is operated by a differential piston operating in a chamber which is separate from and unconnected with the said passage, the said piston controlling the opening of the release-valve by means of a proportionate inequality of the areas of its opposite sides whereby the said piston is adapted to control the operation of the release-valve by fluid-pressure alone, substantially as set forth.

22. In an automatic fluid-pressure brake system, the combination of a direct passage from the train-pipe to the brake-cylinder, a release-valve for controlling the same, a chamber separate from and unconnected with the said passage, and a differential piston operating in the said chamber, the said piston being adapted to control the operation of the release-valve solely by fluid-pressure, substantially as shown and described.

WILLIAM HIRST.

Witnesses:
THOMAS POOLE,
HENRY J. INGRAM.